United States Patent
Sato et al.

(10) Patent No.: US 11,745,395 B2
(45) Date of Patent: Sep. 5, 2023

(54) MOLDED COMPONENT

(71) Applicant: Alps Alpine Co., Ltd., Tokyo (JP)

(72) Inventors: Takashi Sato, Miyagi-ken (JP); Fumihito Kagaya, Miyagi-ken (JP)

(73) Assignee: Alps Alpine Co., Ltd.

( * ) Notice: Subject to any disclaimer, the term of this patent is extended or adjusted under 35 U.S.C. 154(b) by 0 days.

(21) Appl. No.: 17/557,110

(22) Filed: Dec. 21, 2021

(65) Prior Publication Data

US 2022/0111564 A1 Apr. 14, 2022

Related U.S. Application Data

(63) Continuation of application No. PCT/JP2020/010948, filed on Mar. 12, 2020.

(30) Foreign Application Priority Data

Jul. 29, 2019 (JP) ................................. 2019-138988

(51) Int. Cl.
*G09F 13/08* (2006.01)
*B29C 33/42* (2006.01)
(Continued)

(52) U.S. Cl.
CPC .............. *B29C 33/42* (2013.01); *B29C 45/16* (2013.01); *B60R 13/02* (2013.01); *G09F 13/08* (2013.01)

(58) Field of Classification Search
CPC ......... B29C 33/42; B29C 45/16; B60R 13/02; G09F 13/08
See application file for complete search history.

(56) References Cited

U.S. PATENT DOCUMENTS

2008/0233367 A1* 9/2008 Maeda ................. H01Q 1/40
427/58
2011/0247158 A1 10/2011 Jungnickel et al.
(Continued)

FOREIGN PATENT DOCUMENTS

DE 102017214129 A1 * 2/2019 ........... B60R 13/005
JP H0788884 A * 4/1995
(Continued)

OTHER PUBLICATIONS

International Search Report for corresponding International Application No. PCT/JP2020/010948 dated May 29, 2020 with English translation (7 Pages).

*Primary Examiner* — Fatima N Farokhrooz
(74) *Attorney, Agent, or Firm* — Harness, Dickey & Pierce, P.L.C.

(57) ABSTRACT

A molded component displays an optical image that is visible from a front by allowing light that is emitted from a light source that is disposed at a back to pass therethrough. The molded component includes a light-shielding resin member that has an optical transmission hole that has a shape depending on the optical image in a plan view, and a transparent resin member that is optically transparent and that is stacked on a surface of the light-shielding resin member that faces the front such that the transparent resin member covers at least the optical transmission hole. The transparent resin member includes a peripheral portion that has a constant thickness, and a thin portion that is disposed inside the peripheral portion and that is thinner than the peripheral portion.

14 Claims, 3 Drawing Sheets

(51) Int. Cl.
    *B29C 45/16*     (2006.01)
    *B60R 13/02*     (2006.01)

(56) References Cited

U.S. PATENT DOCUMENTS

| | | |
|---|---|---|
| 2013/0335997 A1 | 12/2013 | Roberts et al. |
| 2014/0093665 A1* | 4/2014 | Horibe .................. B60R 13/005 428/31 |
| 2015/0140259 A1* | 5/2015 | Sugiura ................... B32B 27/34 428/161 |
| 2019/0195460 A1* | 6/2019 | Ano ...................... F21S 41/336 |

FOREIGN PATENT DOCUMENTS

| | | | |
|---|---|---|---|
| JP | H02-62586 A | 2/2002 | |
| JP | H02-72489 A | 3/2002 | |
| JP | 2002-301895 A | 10/2002 | |
| JP | 2013-506882 A | 2/2013 | |
| JP | 2012-42679 A | 3/2013 | |
| JP | 2014-044375 A | 3/2014 | |
| WO | WO-2015079539 A1 * | 6/2015 | ............. G05B 19/05 |

\* cited by examiner

MOLDED COMPONENT

CLAIM OF PRIORITY

This application is a Continuation of International Application No. PCT/JP2020/010948 filed on Mar. 12, 2020, which claims benefit of Japanese Patent Application No. 2019-138988 filed on Jul. 29, 2019. The entire contents of each application noted above are hereby incorporated by reference.

BACKGROUND OF THE INVENTION

1. Field of the Invention

The present invention relates to a molded component.

2. Description of the Related Art

A technique for providing a visual sense of depth to a design surface by stacking a transparent resin member that has a constant thickness on the design surface is used for an existing resin molded component that is used for, for example, an interior component of an automobile.

For example, Japanese Unexamined Patent Application Publication No. 2011-156771 described below discloses a technique for forming a two-color molding decorative product that has the sense of depth by providing an insert sheet that has a decorative layer between primary mold resin and secondary mold resin that is transparent.

SUMMARY OF THE INVENTION

However, the technique in Japanese Unexamined Patent Application Publication No. 2011-156771 described above caries a risk that various kinds of failures, such as an increase in a cooling time during molding, an increase in the amount of a material that is used, and an increase in the incidence of a sink mark, occur because the thickness of the secondary mold resin is constant.

The present invention provides a molded component that displays an optical image that is visible from a front by allowing light that is emitted from a light source that is disposed at a back to pass therethrough. The molded component includes a light-shielding resin member that has an optical transmission hole that has a shape depending on the optical image in a plan view, and a transparent resin member that is optically transparent and that is stacked on a surface of the light-shielding resin member that faces the front such that the transparent resin member covers at least the optical transmission hole. The transparent resin member includes a peripheral portion that has a constant thickness, and a thin portion that is disposed inside the peripheral portion and that is thinner than the peripheral portion.

According to an embodiment, a molded component that can achieve the visual sense of depth and that reduces the occurrence of various kinds of failures during molding can be provided.

DESCRIPTION OF THE PREFERRED EMBODIMENTS

An embodiment will hereinafter be described with reference to the drawings.

Summary of Molded Component 100

Figure 1:
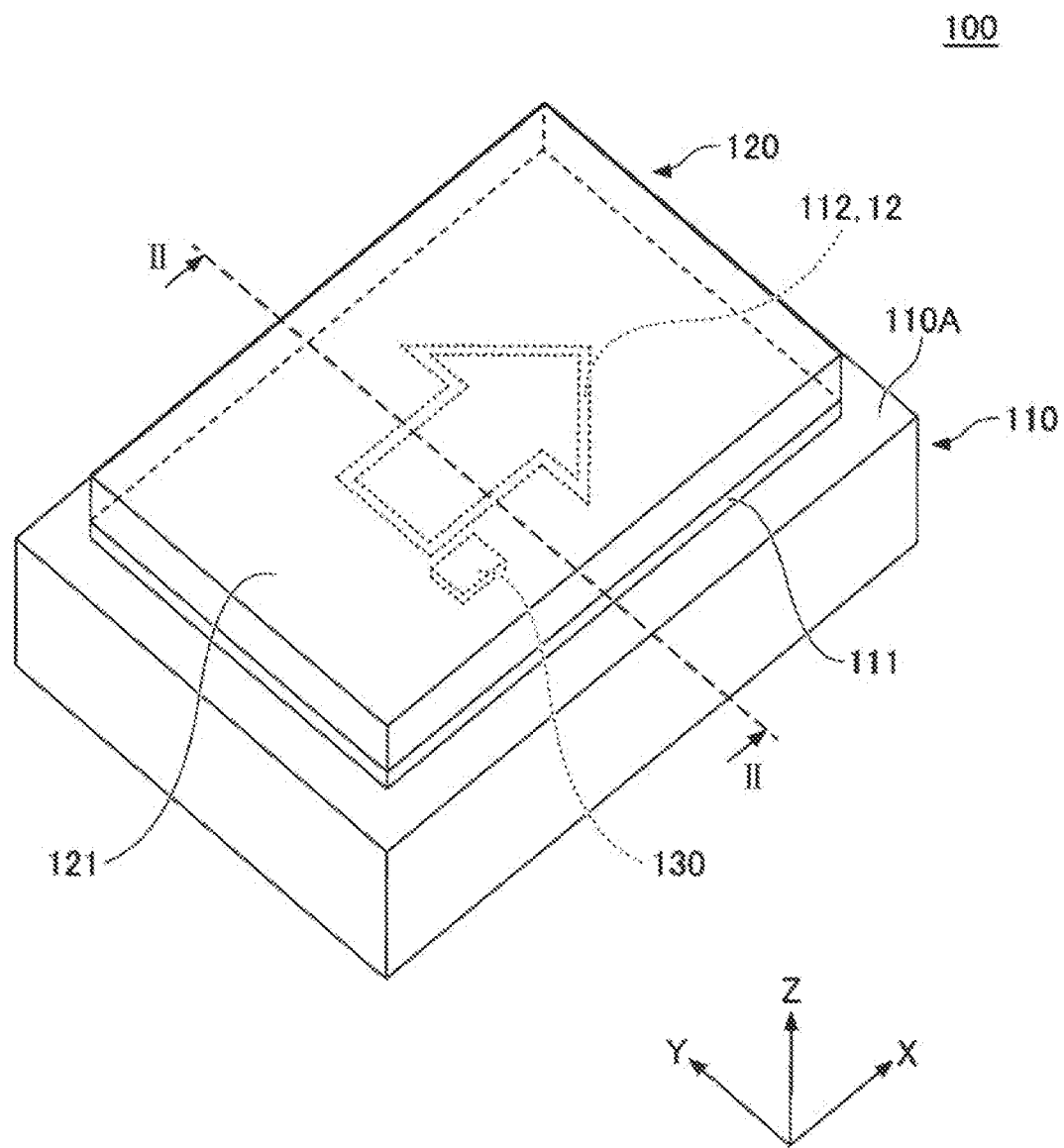
FIG. 1 is a perspective view of a molded component according to an embodiment.

FIG. 1 is a perspective view of a molded component 100 according to an embodiment. The molded component 100 illustrated in FIG. 1 displays an optical image 12 that is visible from a front (a Z-axis positive position) by allowing light that is emitted from a light source 130 (for example, a LED (a light emitting diode)) that is disposed at a back (a Z-axis negative position) to pass therethrough. For example, the molded component 100 is used for an interior component (for example, a panel or a switch) of an automobile and notifies a user of a warning or the function of the automobile by displaying the optical image 12.

As illustrated in FIG. 1, the molded component 100 includes a light-shielding resin member 110 and a transparent resin member 120 and has a two-layer structure of the light-shielding resin member 110 and the transparent resin member 120. The molded component 100 may be formed by two-color molding such that the light-shielding resin member 110 and the transparent resin member 120 are integrally formed.

The light-shielding resin member 110 is a light-shielding member. In an example illustrated in FIG. 1, the light-shielding resin member 110 has a substantially rectangular cuboid shape as a whole. As illustrated in FIG. 1, the light-shielding resin member 110 includes a panel portion 111 on a front surface 110A that is a surface of the light-shielding resin member 110 that faces the front so as to be higher than the periphery. The panel portion 111 has an optical transmission hole 112 that enables the light that is emitted from the light source 130 to pass from the back of the panel portion 111 to the front of the panel portion 111. The optical transmission hole 112 has a shape depending on the optical image 12 in a plan view from above (a positive Z-axis direction).

The light that is emitted from the light source 130 that is disposed at the back of the panel portion 111 (the Z-axis negative position) passes from the back of the panel portion 111 to the front of the panel portion 111 via the optical transmission hole 112. Consequently, the optical image 12 that is visible from the front of the panel portion 111 (the Z-axis positive position) is displayed on a front surface 111A of the panel portion 111. According to the present embodiment, an example of the shape of the optical transmission hole 112 is an arrow shape but is not limited thereto. The optical transmission hole 112 can have a freely determined shape depending on the use of the molded component 100.

The light-shielding resin member 110 is composed of a light-shielding resin material. According to the present embodiment, the light-shielding resin member 110 is composed of black colored synthetic resin of PC (polycarbonate resin) and ABS polycarbonate as an example of the light-shielding resin material. Consequently, the light-shielding resin member 110 has black color and light-shielding properties as a whole.

The transparent resin member 120 is optically transparent and has a substantially flat plate shape. The transparent resin member 120 is stacked on the surface of the panel portion 111 of the light-shielding resin member 110 that faces the front (the Z-axis positive position) so as to cover at least the optical transmission hole 112. A front surface 121 that is a surface of the transparent resin member 120 that faces the front (the Z-axis positive position) is smooth and flat. The transparent resin member 120 protects the front surface of the panel portion 111 of the light-shielding resin member 110 and has a certain degree of thickness. Consequently, when the molded component 100 is viewed from the front (the Z-axis positive position), a user can be provided with the visual sense of depth from the front surface 121 of the transparent resin member 120 to the front surface of the panel portion 111.

The transparent resin member 120 is composed of an optically transparent resin material. According to the present embodiment, the transparent resin member 120 is composed of PC (polycarbonate resin) that has smoke color such as light gray as an example of the optically transparent resin material. Consequently, the transparent resin member 120 has smoke color and optically transparent properties as a whole. The smoke color is not limited to light gray according to the present embodiment but includes general color that has "color tone that reduces visible light transmittance", and the color tone and the transmittance can be freely selected to visual requirements.

As for the molded component 100 that has such a structure, the light source 130 lights up under control from the outside, and then the light that is emitted from the light source 130 passes through the optical transmission hole 112 that is formed in the panel portion 111. Consequently, the optical image 12 is displayed on the panel portion 111. The optical image 12 that is displayed on the panel portion 111 is visible for the user from the front surface 121 of the transparent resin member 120 via the transparent resin member 120.

As for the molded component 100, the light source 130 is turned off under control from the outside, and then the optical image 12 is not displayed on the panel portion 111. As for the molded component 100 according to the present embodiment, the transparent resin member 120 has smoke color, and the front surface of the panel portion 111 has black color. Accordingly, when the optical image 12 is not displayed, the optical transmission hole 112 is unlikely to be visible from the front surface 121 of the transparent resin member 120. That is, for the user, the panel portion 111 on which the optical image 12 is displayed becomes in a state in which nothing is displayed, or a state called "Black-out" or "Secret-until-lit".

Structure of Molded Component 100

Figure 2:
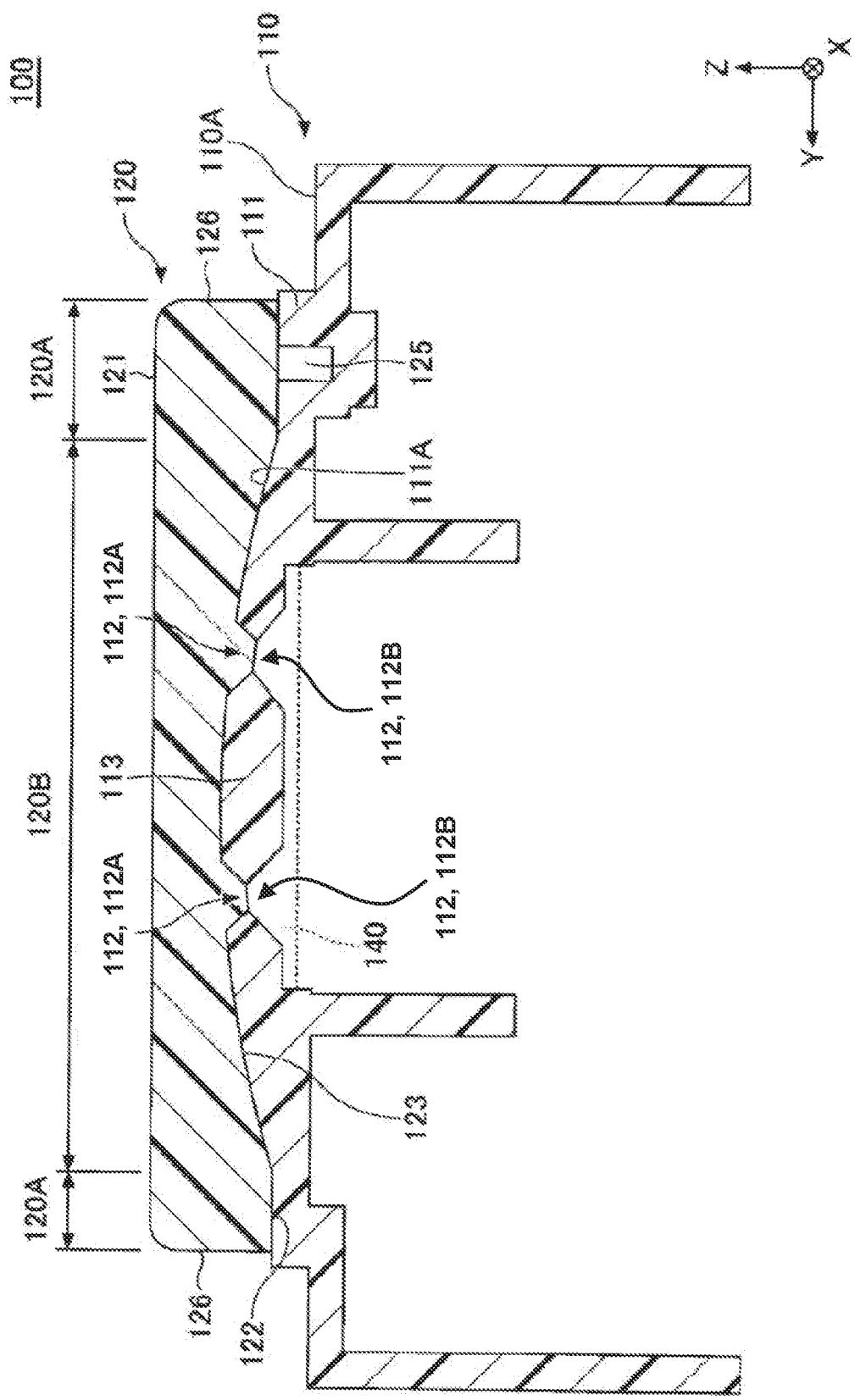
FIG. 2 is a sectional view of the molded component illustrated in FIG. 1 taken along line II-II.

FIG. 2 is a sectional view of the molded component 100 illustrated in FIG. 1 taken along line II-II. As illustrated in FIG. 2, the light-shielding resin member 110 may include a domed projecting portion 113 in a central portion on the front surface 111A of the panel portion 111. As for the panel portion 111, the optical transmission hole 112 is formed in the projecting portion 113. The optical transmission hole 112 may include a front opening portion 112A that is formed at a position facing the front (the Z-axis positive position) and a back opening portion 112B that is formed at a position facing the back (the Z-axis negative position).

As for the transparent resin member 120, the front surface 121 that is the surface that faces the front (the Z-axis positive position) may be flat, and a recessed portion 123 that is in close contact with the projecting portion 113 and that has a curved shape may be formed on a central portion of a back surface 122 that is a surface that faces the back (the Z-axis negative position). As a result of formation of the recessed portion 123, the transparent resin member 120 includes a peripheral portion 120A that has a constant thickness and a thin portion 120B that is disposed inside the peripheral portion 120A and that is thinner than the peripheral portion 120A. In particular, the recessed portion 123 has a curved shape, and accordingly, the thin portion 120B has a thickness that gradually decreases in a direction toward the center of the recessed portion 123.

The molded component 100 according to the present embodiment thus includes the transparent resin member 120 that includes the peripheral portion 120A that has a constant thickness. Consequently, when the molded component 100 according to the present embodiment is viewed from the front (the Z-axis positive position), the user can be provided with the visual sense of depth from the front surface 121 of the transparent resin member 120 to the front surface 111A of the panel portion 111. As for the molded component 100 according to the present embodiment, the visual sense of depth is clearly felt when side surface portions 126 and edge portions of the peripheral portion 120A of the transparent resin member 120 are obliquely viewed from the front. For this reason, as for the molded component 100 according to the present embodiment, the visual sense of depth is likely to be felt in a manner in which the peripheral portion 120A that includes the side surface portions 126 and the edge portions that have a constant thickness.

In particular, as for the molded component 100 according to the present embodiment, the front surface 121 of the transparent resin member 120 is flat, and accordingly, the user is unlikely to be aware of a change in thickness of the thin portion 120B from that of the peripheral portion 120A because of a user illusion, and accordingly, the user can be provided with the same sense of depth as that of the peripheral portion 120A.

As for the molded component 100 according to the present embodiment, the transparent resin member 120 includes the thin portion 120B. Consequently, the molded component 100 according to the present embodiment can exert effects such as a decrease in a cooling time during molding, a decrease in the amount of a material that is used, and a decrease in the incidence of a sink mark unlike an existing structure that includes a transparent resin member that has a constant thickness as a whole. Accordingly, the molded component 100 according to the present embodiment can achieve the visual sense of depth and reduce the occurrence of various kinds of failures during molding.

The transparent resin member 120 may be a primary molded component that is formed by using a primary mold. The light-shielding resin member 110 may be a secondary molded component that is formed by using a secondary mold so as to be stacked on the transparent resin member 120.

The molded component 100 according to the present embodiment includes the transparent resin member 120 that is the primary molded component and can consequently increase the degree of freedom of conditions in which the transparent resin member 120 is molded because the transparent resin member 120 is separately molded. For this reason, the molded component 100 according to the present embodiment can reduce the occurrence of, for example, a sink mark when the transparent resin member 120 is molded and improve the quality of the appearance of the transparent resin member 120.

The transparent resin member 120 may be composed of a resin material that has smoke color. The light-shielding resin member 110 may be composed of a resin material that has black color. Consequently, as for the molded component 100 according to the present embodiment, the optical transmission hole 112 can be unlikely to be visible from the front of the molded component 100 at relatively low costs when the light source 130 is turned off.

As illustrated in FIG. 2, a gate portion 125 that is formed when the transparent resin member 120 is molded remains on the peripheral portion 120A at the back surface 122 of the transparent resin member 120. The gate portion 125 may be covered by the light-shielding resin member 110. The transparent resin member 120 has smoke color. For this reason, the gate portion 125 is unlikely to be visible from the front of the molded component 100. For this reason, as for the molded component 100 according to the present embodiment, the gate portion 125 may largely remain. That is, the degree of freedom of the design of the gate portion 125 in a process of manufacturing the molded component 100 increases, and a process of removing the gate portion 125 can be omitted.

As illustrated in FIG. 2, the optical transmission hole 112 is formed in the projecting portion 113 on the panel portion 111. That is, the optical transmission hole 112 may be formed in the panel portion 111 at a position at which the optical transmission hole 112 faces a surface of the thin portion 120B of the transparent resin member 120 that faces the back. Consequently, the molded component 100 according to the present embodiment has a decreased thickness at a refraction portion and can consequently reduce a phenomenon in which light is refracted due to the refractive index of the transparent resin member 120, and the position of the optical image 12 that is viewed shifts from the actual position when the molded component 100 is obliquely viewed from the front.

Detailed Shape of Optical Transmission Hole 112

Figure 3:
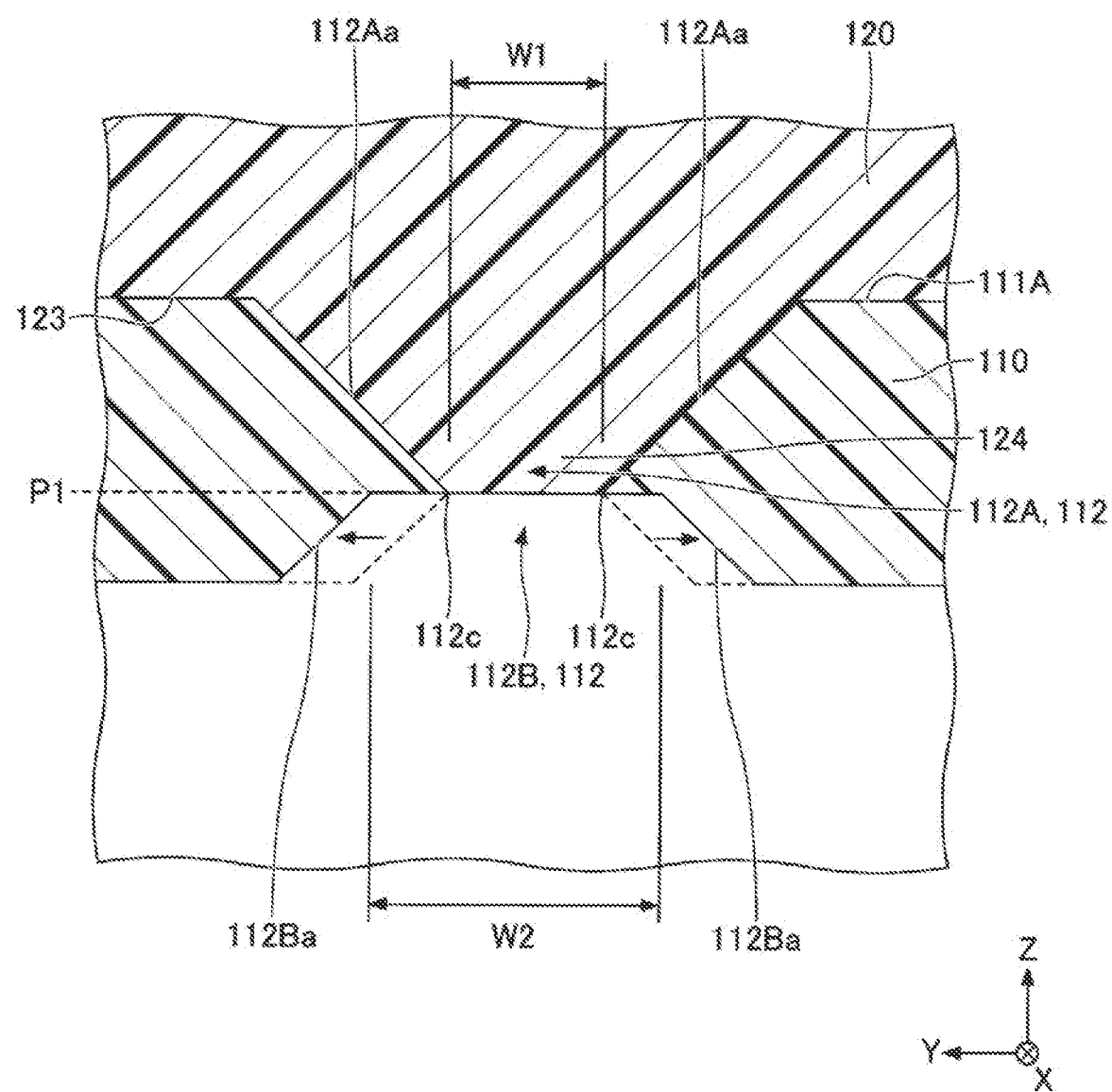
FIG. 3 is an enlarged view of a part of the molded component illustrated in FIG. 2.

FIG. 3 is an enlarged view of a part of the molded component 100 illustrated in FIG. 2. As illustrated in FIGS. 2 and 3, the optical transmission hole 112 may include a front opening portion 112A that is formed at a position nearer than a boundary position P1 to the front (the Z-axis positive position) and a back opening portion 112B that is formed at a position nearer than the boundary position P1 to the back (the Z-axis negative position). The transparent resin member 120 may be composed of a resin material that has smoke color. The light-shielding resin member 110 may be composed of a resin material that has black color. Consequently, as for the molded component 100 according to the present embodiment, the front opening portion 112A of the optical transmission hole 112 can be unlikely to be visible from the front of the molded component 100 at relatively low costs when the light source 130 is turned off.

The front opening portion 112A has front inclined surfaces 112Aa. The front inclined surfaces 112Aa are inclined so as to extend outward while extending toward the front (the Z-axis positive position). Consequently, the front opening portion 112A has a sectional shape of a trapezoid such that an opening width gradually increases in a direction toward the front (the Z-axis positive position). A projecting portion 124 that is formed on the recessed portion 123 of the transparent resin member 120 and that has the same shape as that of the front opening portion 112A is fitted into the front opening portion 112A.

The back opening portion 112B has back inclined surfaces 112Ba. The back inclined surfaces 112Ba are inclined so as to extend outward while extending toward the back (the Z-axis negative position). Consequently, the back opening portion 112B has a sectional shape of a trapezoid such that an opening width gradually increases in a direction toward the back (the Z-axis negative position).

According to the present embodiment, the back opening portion 112B corresponds to an air layer but is not limited thereto. An optical diffusion member 140 (see FIG. 2) that diffuses light may be fitted into the back opening portion 112B from the back. In this case, the optical diffusion member 140 may be fitted into the back opening portion 112B by three-color molding or may be fitted into the back opening portion 112B after being formed by another molding method. For example, the optical diffusion member 140 is composed of an acrylic resin material or a PC resin material containing silicon beads.

As for the molded component 100 according to the present embodiment, the optical transmission hole 112 thus includes the front opening portion 112A and the back opening portion 112B. Consequently, the resin material easily flows into the front opening portion 112A and the back opening portion 112B when the light-shielding resin member 110 is molded. For this reason, for example, edge portions 112C around the optical transmission hole 112 that are formed at the boundary position P1 are inhibited from being rounded (a short mold).

As illustrated in FIG. 3, the minimum opening width W2 (that is, the opening width W2 at the boundary position P1) of the back opening portion 112B is larger than the minimum opening width W1 (that is, the opening width W1 at the boundary position P1) of the front opening portion 112A. That is, as illustrated by arrows in FIG. 3, the back inclined surfaces 112Ba of the back opening portion 112B may be nearer than the front inclined surfaces 112Aa of the front opening portion 112A to the outside in the direction of the opening width. Consequently, the edge portions 112C that are sharp are formed at the boundary position P1 of the optical transmission hole 112.

Consequently, when the molded component 100 is viewed from the front, the molded component 100 according to the present embodiment can inhibit the back inclined surfaces 112Ba of the back opening portion 112B from being visible due to a difference between the refractive index (for example, 1.59 for PC) of the transparent resin member 120 and the refractive index of the air layer even in the case where light is refracted at the boundary position P1. For this reason, the molded component 100 according to the present embodiment can inhibit the edge portions 112C of the optical transmission hole 112 from being blurredly viewed due to the back inclined surfaces 112Ba.

An embodiment of the present invention is described in detail above. The present invention, however, is not limited to the embodiment. Various modifications and alterations can be made within the range of the spirit of the present invention recited in claims.

For example, the present invention can be used for an interior component for use in a vehicle but is not limited thereto. The present invention can be used for a molded component that has any use.

The present invention is not limited to a molded component that includes a light-shielding resin member a front surface of which has black color. For example, the present invention can be used for a molded component that includes a light-shielding resin member a front surface of which is decorated by a decorative layer (for example, a decorative sheet).

The present invention is not limited to a molded component that includes a transparent resin member that has smoke color. For example, the present invention can be used for a molded component that includes a transparent resin member that is colorless or a transparent resin member that has color other than smoke color.

What is claimed is:

1. A molded component that displays an optical image that is visible from a front by allowing light that is emitted from a light source that is disposed at a back to pass therethrough, the molded component comprising:
   a light-shielding resin member that has an optical transmission hole that has a shape depending on the optical image in a plan view, the light-shielding resin member having a vertical support structure along a length of the light-shielding resin member; and
   a transparent resin member that is optically transparent and that is stacked on a surface of the light-shielding resin member that faces the front such that the transparent resin member covers at least the optical transmission hole,
   wherein the transparent resin member includes:
   a peripheral portion that has a constant thickness; and
   a thin portion that is disposed inside the peripheral portion and that is thinner than the peripheral portion,
   the light-shielding resin member includes a domed projecting portion on the surface that faces the front such that a height of the domed projecting portion gradually increases from a peripheral portion of the light-shielding resin member toward a center portion of the light-shielding resin member,
   a surface of the transparent resin member that faces the front is flat,
   the transparent resin member includes a recessed portion that is in close contact with the domed projecting portion and that has a curved shape on a surface that faces the back, and
   the recessed portion forms the thin portion such that a thickness of the recessed portion gradually decreases from the peripheral portion of the transparent resin member toward a center portion of the transparent resin member.

2. The molded component according to claim 1, wherein the transparent resin member and the light-shielding resin member are integrally molded by two-color molding,
   wherein the transparent resin member is a primary molded component, and
   wherein the light-shielding resin member is a secondary molded component.

3. The molded component according to claim 1, wherein the transparent resin member is composed of a resin material that has smoke color, and
   wherein the light-shielding resin member is composed of a resin material that has black color.

4. The molded component according to claim 1, wherein the optical transmission hole is formed in the light-shielding resin member at a position at which the optical transmission hole faces the thin portion.

5. The molded component according to claim 3, wherein the optical transmission hole includes:
   a front opening portion that faces the front and that has a front inclined surface such that an opening width gradually increases in a direction toward the front; and
   a back opening portion that faces the back and that has a back inclined surface such that an opening width gradually increases in a direction toward the back.

6. The molded component according to claim 3, wherein a gate portion that is formed when the transparent resin member is molded is covered by the light-shielding resin member.

7. The molded component according to claim 5, wherein the back inclined surface is formed so as to be nearer than the front inclined surface to an outside in a direction of the opening width.

8. A molded component that displays an optical image that is visible from a front by allowing light that is emitted from a light source that is disposed at a back to pass therethrough, the molded component comprising:
   a light-shielding resin member that has an optical transmission hole that has a shape depending on the optical image in a plan view, the light-shielding resin member having a vertical support structure along a length of the light-shielding resin member; and
   a transparent resin member that is optically transparent and that is stacked on a surface of the light-shielding resin member that faces the front such that the transparent resin member covers at least the optical transmission hole,
   wherein the transparent resin member includes:
   a peripheral portion that has a constant thickness; and
   a thin portion that is disposed inside the peripheral portion and that is thinner than the peripheral portion, and
   the optical transmission hole includes:
   a front opening portion that faces the front and that has a front inclined surface such that an opening width gradually increases in a direction toward the front, and the front inclined surface is in close contact with the transparent resin member; and
   a back opening portion that faces the back and that has a back inclined surface such that an opening width gradually increases in a direction toward the back, and the back inclined surface is isolated from the transparent resin member.

9. The molded component according to claim 8, wherein the light-shielding resin member includes a domed projecting portion on the surface that faces the front,
   a surface of the transparent resin member that faces the front is flat,
   the transparent resin member includes a recessed portion that is in close contact with the projecting portion and that has a curved shape on a surface that faces the back, and
   the recessed portion forms the thin portion.

10. The molded component according to claim 8, wherein the transparent resin member and the light-shielding resin member are integrally molded by two-color molding,
    wherein the transparent resin member is a primary molded component, and
    wherein the light-shielding resin member is a secondary molded component.

11. The molded component according to claim 8, wherein the transparent resin member is composed of a resin material that has smoke color, and
    wherein the light-shielding resin member is composed of a resin material that has black color.

12. The molded component according to claim 8, wherein the back inclined surface is formed so as to be nearer than the front inclined surface to an outside in a direction of the opening width.

13. The molded component according to claim 8, wherein the optical transmission hole is formed in the light-shielding resin member at a position at which the optical transmission hole faces the thin portion.

14. The molded component according to claim 11, wherein a gate portion that is formed when the transparent resin member is molded is covered by the light-shielding resin member.

* * * * *